United States Patent
Chen et al.

(10) Patent No.: US 11,558,127 B2
(45) Date of Patent: Jan. 17, 2023

(54) METHOD FOR CALIBRATING TRANSMITER-TO-RECEIVER RELATIVE PHASE IN MILLIMETER WAVE BEAMFORMING SYSTEM AND ASSOCIATED MILLIMETER WAVE ANTENNA MODULE

(71) Applicant: MEDIATEK INC., Hsin-Chu (TW)

(72) Inventors: Kuo-Hao Chen, Hsinchu (TW); Hsiao-Tung Lin, Hsinchu (TW); Chun-Ying Ma, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/500,910

(22) Filed: Oct. 13, 2021

(65) Prior Publication Data
US 2022/0123845 A1  Apr. 21, 2022

Related U.S. Application Data

(60) Provisional application No. 63/093,327, filed on Oct. 19, 2020.

(51) Int. Cl.
| | |
|---|---|
| H04B 7/02 | (2018.01) |
| H04B 17/12 | (2015.01) |
| H04B 17/16 | (2015.01) |
| H04B 17/24 | (2015.01) |
| H04B 7/0426 | (2017.01) |

(52) U.S. Cl.
CPC ............ *H04B 17/12* (2015.01); *H04B 7/043* (2013.01); *H04B 17/16* (2015.01); *H04B 17/24* (2015.01)

(58) Field of Classification Search
CPC ........ H04B 17/12; H04B 7/043; H04B 17/16; H04B 17/24; H01Q 3/34; H01Q 1/241; H01Q 3/005; H01Q 21/00
USPC .................................................. 375/262, 267
See application file for complete search history.

(56) References Cited

U.S. PATENT DOCUMENTS

| | | | | |
|---|---|---|---|---|
| 9,647,744 B2 * | 5/2017 | Liu | ...................... | H04B 7/0617 |
| 9,948,408 B1 * | 4/2018 | Gomadam | ............ | H01Q 3/267 |
| 2006/0279459 A1 | 12/2006 | Akiyama | | |

(Continued)

FOREIGN PATENT DOCUMENTS

| | | |
|---|---|---|
| EP | 1 433 271 B1 | 12/2007 |
| EP | 3 664 322 A1 | 6/2020 |

*Primary Examiner* — Don N Vo
(74) *Attorney, Agent, or Firm* — Winston Hsu

(57) ABSTRACT

A method for calibrating a transmitter-to-receiver (T2R) relative phase in millimeter wave (mmWave) beamforming system includes: transmitting a first calibrated signal to a second antenna of the mmWave beamforming system through a first antenna of the mmWave beamforming system according to a first transmitter (TX) input signal; receiving the first calibrated signal through the second antenna, and obtaining a first loopback receiver (RX) signal according to the first calibrated signal received by the second antenna; transmitting a second calibrated signal to the first antenna through the second antenna according to a second TX input signal; receiving the second calibrated signal through the first antenna, and obtaining a second loopback RX signal according to the second calibrated signal received by the first antenna; and calibrating the T2R relative phase according to a phase difference between the first and second loopback RX signals.

18 Claims, 4 Drawing Sheets

(56) References Cited

U.S. PATENT DOCUMENTS

| | | | |
|---|---|---|---|
| 2008/0129613 A1* | 6/2008 | Ermutlu | H01Q 3/267 |
| | | | 343/703 |
| 2015/0118970 A1 | 4/2015 | Thoukydides | |
| 2017/0214427 A1 | 7/2017 | Chayat | |
| 2019/0267707 A1* | 8/2019 | Khalil | H01Q 21/0025 |

\* cited by examiner

METHOD FOR CALIBRATING TRANSMITTER-TO-RECEIVER RELATIVE PHASE IN MILLIMETER WAVE BEAMFORMING SYSTEM AND ASSOCIATED MILLIMETER WAVE ANTENNA MODULE

CROSS REFERENCE TO RELATED APPLICATIONS

This application claims the benefit of U.S. provisional application No. 63/093,327, filed on Oct. 19, 2020 and incorporated herein by reference.

BACKGROUND

With the development of technology, the problem of insufficient bandwidth makes mobile operators look for underutilized millimeter wave (mmWave) spectrum between 3 GHz and 300 GHz, and the fifth-generation (5G) mobile wireless communication system is expected to provide high data rate in the mmWave frequency band. Since mmWave has large path loss and bad penetration, the antenna design needs to utilize the antenna array to generate high directivity and adjustable dynamic beam scanning to provide sufficient signal strength. The antenna array and radio frequency integrated circuit (RFIC) may be packaged in a mmWave antenna module (AM), which includes many antenna units to increase the beamforming gain.

In beamforming system, transmitter (TX) and receiver (RX) beam directions with the same array weight vector (AWV) setting should be ideally the same that is what beam correspondence is defined. However, TX and RX beams would not always have good correspondence because the phase of TX and RX paths may not be the same. As a result, there is an urgent need for a novel method to calibrate the transmitter-to-receiver (T2R) relative phase.

SUMMARY

It is therefore one of the objectives of the present invention to provide a method for calibrating a T2R relative phase in mmWave beamforming system and an associated mmWave antenna module, to address the above-mentioned problems.

In an embodiment of the present invention, a method for calibrating a T2R relative phase in mmWave beamforming system is provided. The method may include the following steps: transmitting a first calibrated signal to a second antenna of the mmWave beamforming system through a first antenna of the mmWave beamforming system according to a first TX input signal; receiving the first calibrated signal through the second antenna, and obtaining a first loopback RX signal according to the first calibrated signal received by the second antenna; transmitting a second calibrated signal to the first antenna through the second antenna according to a second TX path input signal; receiving the second calibrated signal through the first antenna, and obtaining a second loopback RX signal according to the second calibrated signal received by the first antenna; and calibrating the T2R relative phase according to a phase difference between the first and second loopback RX signals.

In another embodiment of the present invention, an mmWave antenna module (AM) is provided. The mmWave AM may include a first mmWave transceiver path, a second mmWave transceiver path, and a calibration engine. The first mmWave transceiver path may include a first antenna, a first TX path and a first RX path, wherein the first TX path may be arranged to transmit a first calibrated signal to a second antenna through the first antenna according to a first TX input signal, and the first RX path may be arranged to receive a second signal through the first antenna, and obtain a second loopback RX signal according to the second calibrated signal received by the first antenna. The second mmWave transceiver path may include the second antenna, a second TX path and a second RX path, wherein the second TX path may be arranged to transmit the second calibrated signal to the first antenna through the second antenna according to a second TX input signal, and the second RX path may be arranged to receive the first calibrated signal through the second antenna, and obtain a first loopback RX signal according to the first calibrated signal received by the second antenna. The calibration engine may utilize the first and second loopback RX signals to calibrate the T2R relative phase.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
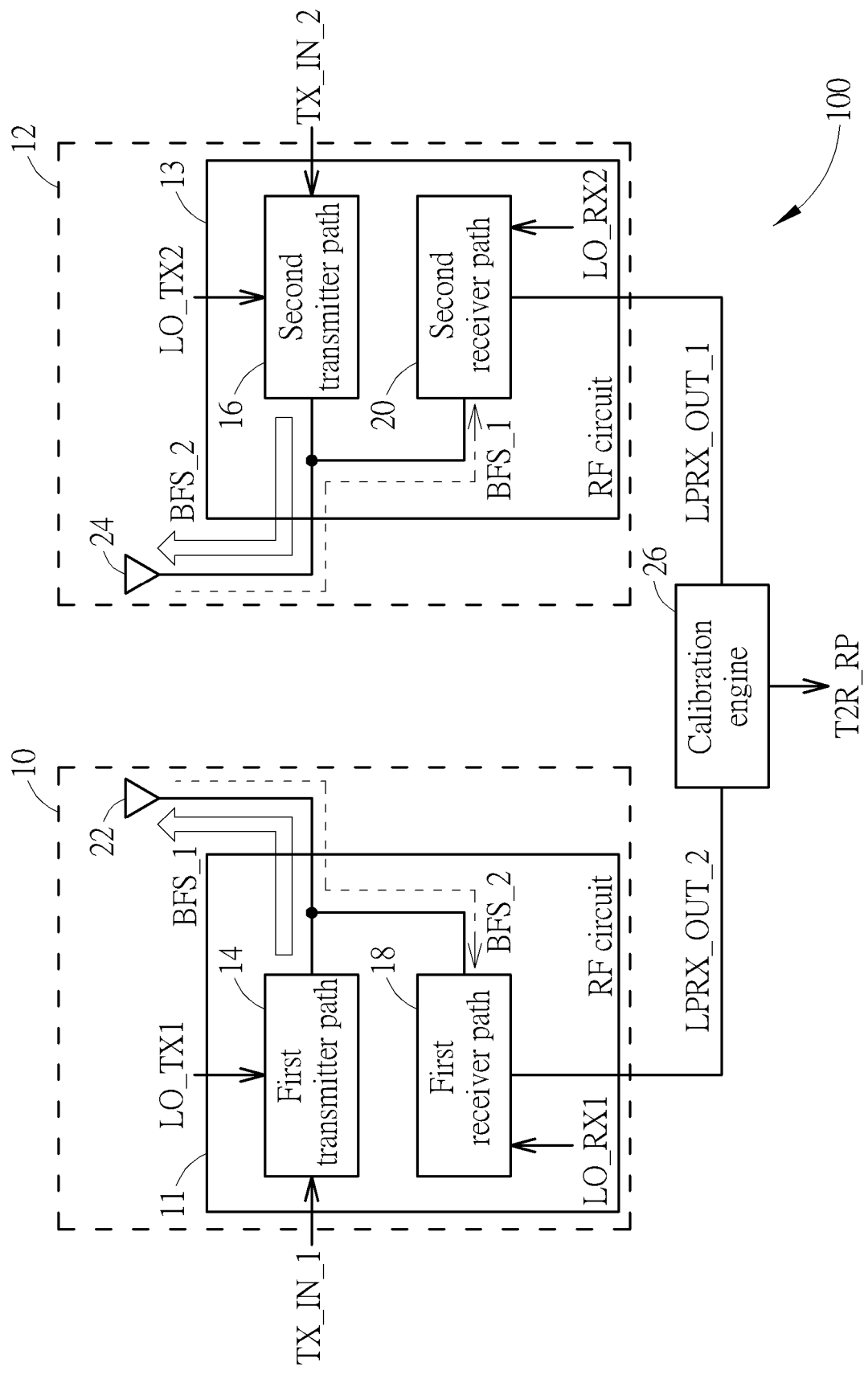
FIG. 1 is a diagram illustrating an mmWave antenna module according to an embodiment of the present invention.

FIG. 1 is a diagram illustrating a millimeter wave (mmWave) antenna module (AM) 100 according to an embodiment of the present invention. The mmWave AM 100 may include a plurality of mmWave transceiver paths 10 and 12 having a plurality of antennas 22 and 24, respectively, and a calibration engine 26. For example, each of the mmWave transceiver paths 10 and 12 may be a part of an mmWave AM. In the following, the terms "mmWave transceiver path" and "antenna array" may be interchangeable. For better understanding of technical features of the present invention, only two mmWave transceiver paths 10 and 12 are illustrated in FIG. 1. In practice, the mmWave AM 100 may include more than two mmWave transceiver paths or antenna arrays, depending upon actual design considerations.

The mmWave transceiver path 10 with the antenna 22 may include a radio-frequency (RF) circuit 11 having a first transmitter (TX) path 14 and a first receiver (RX) path 18, where a local oscillator (LO) signal LO_TX1 is used by upconversion of the first TX path 14, and an LO signal LO_RX1 is used by downconversion of the first RX path 18. The first TX path 14 may be arranged to transmit a calibrated signal BFS_1 to the antenna 24 through the antenna 22 (for brevity, the TX path of the calibrated signal BFS_1 is labeled in the hollow arrow shown in left side of FIG. 1) according to a TX input signal (e.g. an intermediate frequency (IF) signal) TX_IN_1. The first RX path 18 may be arranged to receive a calibrated signal BFS_2 (which is an RF signal) through the antenna 22 (for brevity, the RX path of the calibrated signal BFS_2 is labeled in the arrow depicted with dashed lines), and obtain a loopback RX signal (e.g. an IF signal) LPRX_OUT_2 according to the calibrated signal BFS_2 received by the antenna 22.

The mmWave transceiver path 12 with the antenna 24 may include an RF circuit 13 having a second TX path 16 and a second RX path 20, where an LO signal LO_TX2 is used by upconversion of the second TX path 16, and an LO signal LO_RX2 is used by downconversion of the second RX path 20. The second TX path 16 may be arranged to transmit the calibrated signal (which is an RF signal) BFS_2 to the antenna 22 through the antenna 24 (for brevity, the TX path of the calibrated signal BFS_2 is labeled in the hollow arrow shown in right side of FIG. 1) according to a TX input signal (e.g. an IF signal) TX_IN_2. The second RX path 20 may be arranged to receive the calibrated signal (which is an RF signal) BFS_1 through the antenna 24 (for brevity, the RX path of the calibrated signal BFS_1 is labeled in the arrow depicted with dashed lines), and obtain a loopback RX signal (e.g. an IF signal) LPRX_OUT_1 according to the calibrated signal BFS 1 received by the antenna 24. The calibration engine 26 may use built-in algorithm to calibrate a transmitter-to-receiver (T2R) relative phase T2R_RP according to a phase difference between the loopback RX signal LPRX_OUT_1 from the second RX path 20 and the loopback RX signal LPRX_OUT_2 from the first RX path 18.

In this embodiment, the loopback RX signal LPRX_OUT_1 may include 3 phases: α phase P1, β phase P2, and θ phase P3 (i.e. Phase (LPRX_OUT_1)=P1+P2+P3), wherein the α phase P1 is calculated by adding a phase mismatch of a signal path (i.e. TX path) of the first TX path 14 to a phase mismatch of a signal path (i.e. RX path) of the second RX path 20, the β phase P2 (which is caused due to LO routing trace) is calculated by subtracting a phase mismatch of an LO signal path of the second RX path 20 from a phase mismatch of an LO signal path of the first TX path 14, and the θ phase P3 is calculated by subtracting an initial phase of the LO signal path of the second RX path 20 from an initial phase of the LO signal path of the first TX path 14. In addition, the loopback RX signal LPRX_OUT_2 may also include 3 phases: α phase P4, β phase P5, and θ phase P6 (i.e. Phase (LPRX_OUT_2)=P4+P5+P6), wherein the α phase P4 is calculated by adding a phase mismatch of a signal path (i.e. TX path) of the second TX path 16 to a phase mismatch of a signal path (i.e. RX path) of the first RX path 18, the β phase P5 is calculated by subtracting a phase mismatch of an LO signal path of the first RX path 18 from a phase mismatch of an LO signal path of the second TX path 16, and the θ phase P6 is calculated by subtracting an initial phase of the LO signal path of the first RX path 18 from an initial phase of the LO signal path of the second TX path 16.

In addition, the T2R relative phase T2R_RP may be calibrated and calculated by subtracting phase of the loopback RX signal LPRX_OUT_2 from phase of the loopback RX signal LPRX_OUT_1 (i.e. T2R_RP=Phase (LPRX_OUT_1)−Phase (LPRX_OUT_2)). As a result, the T2R relative phase T2R_RP may be a sum of three phase differences: α phase difference A1, β phase difference A2, and θ phase difference A3 (i.e. the T2R relative phase T2R_RP=A1+A2+A3), wherein the α phase difference A1 is calculated by subtracting a phase difference PD1 from a phase difference PD2 (i.e. A1=PD2−PD1), the phase difference PD1 is calculated by subtracting the phase mismatch of the signal path of the RX path 20 from the phase mismatch of the signal path of the first RX path 18, the phase difference PD2 is calculated by subtracting the phase mismatch of the signal path of the second TX path 16 from the phase mismatch of the signal path of the first TX path 14, the β phase difference A2 is calculated by adding a phase difference PD3 to a phase difference PD4 (i.e. A2=PD3+PD4), the phase difference PD3 is calculated by subtracting the phase mismatch of the LO signal path of the second TX path 16 from the phase mismatch of the LO signal path of the first TX path 14, the phase difference PD4 is calculated by subtracting the phase mismatch of the LO signal path of the second RX path 20 from the phase mismatch of the LO signal path of the first RX path 18, the θ phase difference A3 is calculated by adding a phase difference PD5 to a phase difference PD6 (i.e. A3=PD5+PD6), the phase difference PD5 is calculated by subtracting the initial phase of the LO signal path of the second TX path 16 from the initial phase of the LO signal path of the first TX path 14, and the phase difference PD6 is calculated by subtracting the initial phase of the LO signal path of the second RX path 20 from the initial phase of the LO signal path of the first RX path 18.

Figure 2:
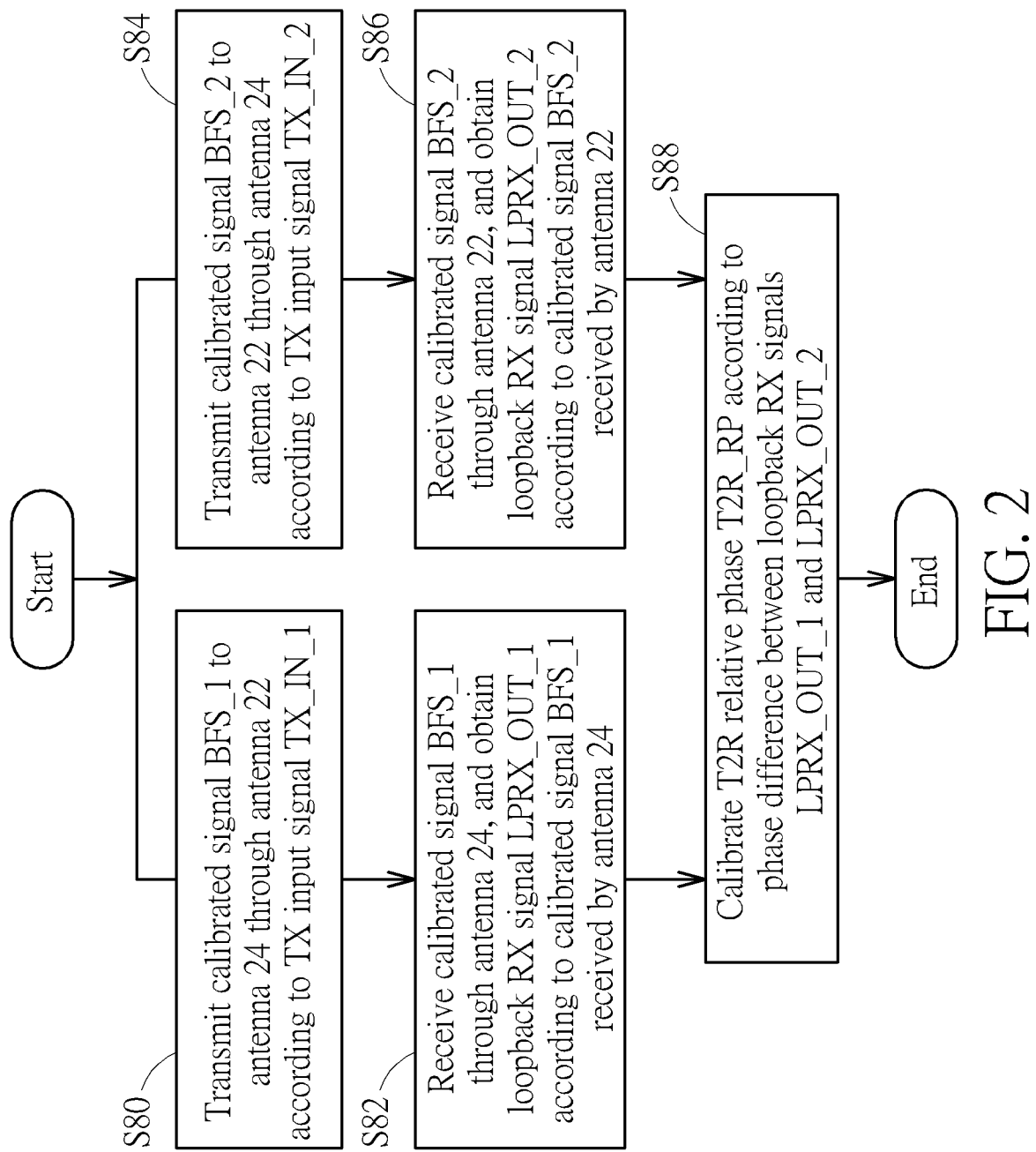
FIG. 2 is a flow chart illustrating a method for calibrating a T2R relative phase in mmWave beamforming system according to an embodiment of the present invention.

FIG. 2 is a flow chart illustrating a method for calibrating the T2R relative phase T2R_RP in mmWave beamforming system according to an embodiment of the present invention. Provided that the result is substantially the same, the steps are not required to be executed in the exact order shown in FIG. 2. For example, the method shown in FIG. 2 may be employed by the mmWave AM 100.

In Step S80, the calibrated signal BFS_1 is transmitted to the antenna 24 through the antenna 22 according to the TX input signal TX_IN_1.

In Step S82, the calibrated signal BFS 1 is received through the antenna 24, and the loopback RX signal LPRX_OUT_1 is obtained according to the calibrated signal BFS_1 received by the antenna 24.

In Step S84, the calibrated signal BFS_2 is transmitted to the antenna 22 through the antenna 24 according to the TX input signal TX_IN_2.

In Step S86, the calibrated signal BFS_2 is received through the antenna 22, and the loopback RX signal LPRX_OUT_2 is obtained according to the calibrated signal BFS_2 received by the antenna 22.

In Step S88, the T2R relative phase T2R_RP is calibrated according to the phase difference between the loopback RX signals LPRX_OUT_1 and LPRX_OUT_2.

Since a person skilled in the pertinent art can readily understand details of the steps after reading above paragraphs directed to the mmWave AM 100, further description is omitted here for brevity.

Figure 3:
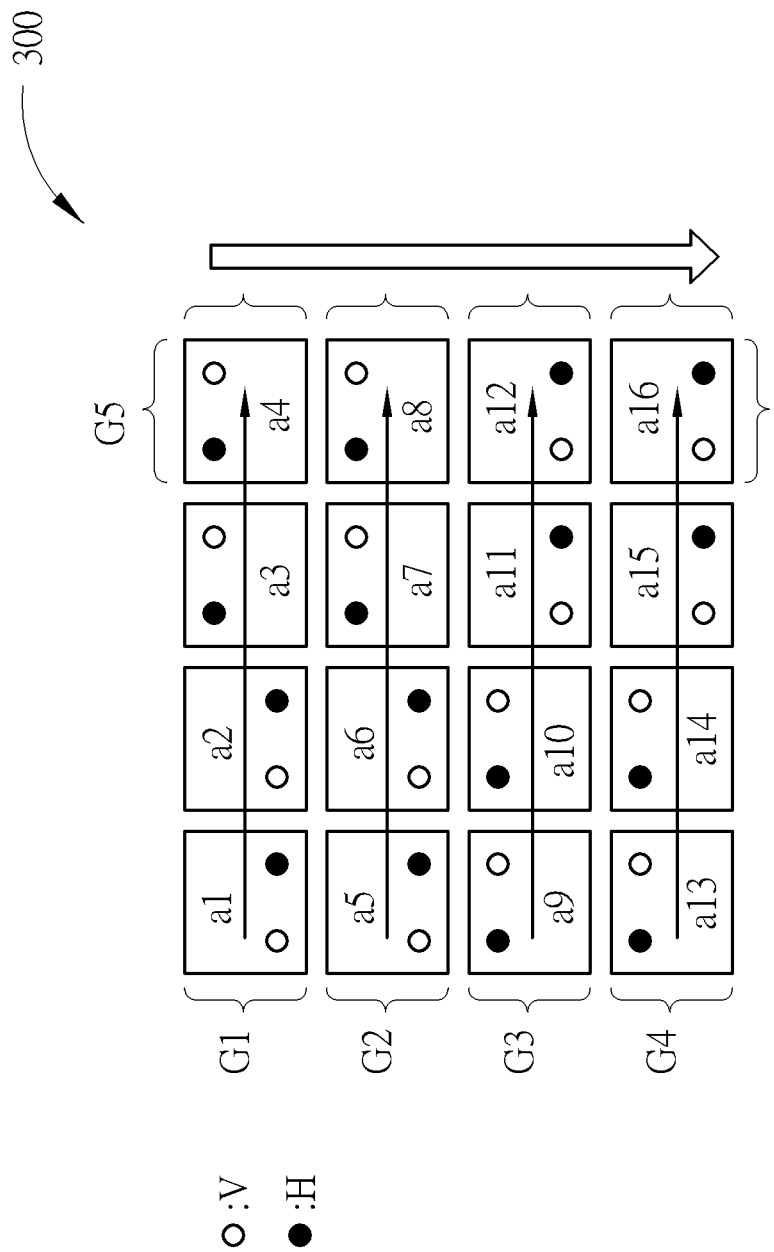
FIG. 3 is a diagram illustrating a smaller antenna array calibration of a T2R relative phase of 16 antenna units according to an embodiment of the present invention.

FIG. 3 is a diagram illustrating a smaller antenna array calibration of a T2R relative phase of 16 antenna units according to an embodiment of the present invention. The 16 antenna units a1-a16 included in a same antenna module (AM) 300 are for illustrative purposes only, and are not meant to be a limitation of the present invention. Each of the antenna units a1-a16 has 2 points representing two different polarizations V and H, respectively, and each polarization is connected to either TX path or RX path. It should be noted that, if the signal is directly transmitted and received between the antenna units a1 and a16 (which are located at the opposite corners of the AM 300, respectively), the signal quality may decrease accordingly. As a result, for the method of the present invention, in the beginning, the 16 antenna units a1-a16 are partitioned into 4 groups G1-G4 horizontally, wherein the group G1 includes antenna units a1-a4, the group G2 includes antenna units a5-a8, the group G3 includes antenna units a9-a12, and the group G4 includes antenna units a13-a16. The number of groups, the partitioning direction, and the number of antenna units in a group in this embodiment are for illustrative purposes only, and are not meant to be a limitation of the present invention. For example, the antenna units in the AM 300 can also be partitioned into 8 groups vertically by two as a group. It is assumed that the antenna units a4, a8, a12, and a16 are set as anchors of the groups G1, G2, G3, and G4, respectively. The T2R relative phases of each group (e.g. the T2R relative phase of the antenna units a1-a4, the T2R relative phase of the antenna units a5-a8, the T2R relative phase of the antenna units a9-a12, and the T2R relative phase of the antenna units a13-a16) are first calibrated by the method of the present invention, respectively. Then, the antenna units a4, a8, a12, and a16 are set in a same group G5, wherein the antenna unit a16 is set as the anchor of the group G5. It should be noted that, the selection of the anchors a4, a8, a12, and a16 of each group in this embodiment is for illustrative purposes only, and is not meant to be a limitation of the present invention. After calibrating the T2R relative phase of the group G5 (i.e. the T2R relative phase of the antenna units a4, a8, a12, and a16), the T2R relative phase of the antenna units a1-a16 can be obtained according to the T2R relative phases of groups G1-G5.

In the group G1, the T2R relative phase between the antenna units a1 and a4, the T2R relative phase between the antenna units a2 and a4, and the T2R relative phase between the antenna units a3 and a4 are first calibrated by the method of the present invention, respectively. It is assumed that, when the polarization V of the antenna unit a4 is connected to the TX path, the polarization H of the antenna units a1-a4 is connected to the RX path. The signal of the antenna unit a4 is transmitted from the TX path of the antenna unit a4 to the RX paths of the antenna units a1-a4, respectively. In addition, when the polarization V of the antenna unit a4 is connected to the RX path, the polarization H of the antenna units a1-a4 is connected to the TX path. The calibrated signals of the antenna units a1-a4 are transmitted from the TX paths of the antenna units a1-a4 to the RX path of the antenna unit a4, respectively. According to the above-mentioned embodiments, the T2R relative phase may be a sum of three phase differences: $\alpha$ phase difference, $\beta$ phase difference, and $\theta$ phase difference (i.e. the T2R relative phase=$\alpha$ phase difference+$\beta$ phase difference+$\theta$ phase difference).

However, it should be noted that, this embodiment only cares the T2R relative phase of the same polarization. As a result, for the $\theta$ phase difference of the T2R relative phase of the antenna units a1-a4, the $\theta$ phase difference is calculated by adding a phase difference FPD to a phase difference SPD, and then subtracting phase differences TPD and CPD therefrom (i.e. $\theta$ phase difference=FPD+SPD−TPD−CPD), wherein the phase difference FPD is calculated by subtracting the initial phase of the LO signal path of the TX path (which is connected to the polarization V) of the antenna unit a4 from the initial phases of the LO signal paths of the TX paths (which is connected to the polarization H) of the antenna units a1-a3, the phase difference SPD is calculated by subtracting the initial phase of the LO signal path of the RX path (which is connected to the polarization V) of the antenna unit a4 from the initial phases of the LO signal paths of the RX paths (which is connected to the polarization H) of the antenna units a1-a3, the phase difference TPD is calculated by subtracting the initial phase of the LO signal path of the TX path (which is connected to the polarization V) of the antenna unit a4 from the initial phases of the LO signal paths of the TX path (which is connected to the polarization H) of the antenna unit a4, and the phase difference CPD is calculated by subtracting the initial phase of the LO signal path of the RX path (which is connected to the polarization V) of the antenna unit a4 from the initial phases of the LO signal paths of the RX path (which is connected to the polarization H) of the antenna unit a4.

Therefore, the $\theta$ phase difference is equal to a sum of a phase difference GPD and a phase difference HPD (i.e. $\theta$ phase difference=FPD+SPD−TPD−CPD=GPD+HPD), wherein the phase difference GPD is calculated by subtracting the initial phase of the LO signal path of the TX path (which is connected to the polarization H) of the antenna unit a4 from the initial phases of the LO signal paths of the TX paths (which is connected to the polarization H) of the antenna units a1-a3, and the phase difference HPD is calculated by subtracting the initial phase of the LO signal path of the RX path (which is connected to the polarization H) of the antenna unit a4 from the initial phases of the LO signal paths of the RX paths (which is connected to the polarization H) of the antenna units a1-a3. As a result, the $\theta$ phase difference of the T2R relative phase of the antenna units a1-a4 is in a same polarization (i.e. the polarization H).

Similarly, in the group G2, the $\theta$ phase difference of the T2R relative phase of the antenna units a5-a8 can be obtained by adding a phase difference calculated by subtracting the initial phase of the LO signal path of the TX path (which is connected to the polarization H) of the antenna unit a8 from the initial phases of the LO signal paths of the TX paths (which is connected to the polarization H) of the antenna units a5-a7 to another phase difference calculated by subtracting the initial phase of the LO signal path of the RX path (which is connected to the polarization H) of the antenna unit a8 from the initial phases of the LO signal paths of the RX paths (which is connected to the polarization H) of the antenna units a5-a7.

In the group G3, the $\theta$ phase difference of the T2R relative phase of the antenna units a9-a12 can be obtained by adding a phase difference calculated by subtracting the initial phase of the LO signal path of the TX path (which is connected to the polarization H) of the antenna unit a12 from the initial phases of the LO signal paths of the TX paths (which is connected to the polarization H) of the antenna units a9-a11 to another phase difference calculated by subtracting the initial phase of the LO signal path of the RX path (which is connected to the polarization H) of the antenna unit a12 from the initial phases of the LO signal paths of the RX paths (which is connected to the polarization H) of the antenna units a9-a11.

In the group G4, the $\theta$ phase difference of the T2R relative phase of the antenna units a13-a16 can be obtained by adding a phase difference calculated by subtracting the initial phase of the LO signal path of the TX path (which is connected to the polarization H) of the antenna unit a16 from the initial phases of the LO signal paths of the TX paths (which is connected to the polarization H) of the antenna units a13-a15 to another phase difference calculated by subtracting the initial phase of the LO signal path of the RX path (which is connected to the polarization H) of the antenna unit a16 from the initial phases of the LO signal paths of the RX paths (which is connected to the polarization H) of the antenna units a13-a15.

In group G5, the θ phase difference of the T2R relative phase of the antenna units a4, a8, a12, and a16 can be obtained by adding a phase difference calculated by subtracting the initial phase of the LO signal path of the TX path (which is connected to the polarization H) of the antenna unit a16 from the initial phases of the LO signal paths of the TX paths (which is connected to the polarization H) of the antenna units a4, a8, and a12 to another phase difference calculated by subtracting the initial phase of the LO signal path of the RX path (which is connected to the polarization H) of the antenna unit a16 from the initial phases of the LO signal paths of the RX paths (which is connected to the polarization H) of the antenna units a4, a8, and a12. As a result, according to the θ phase difference of the T2R relative phase of the groups G1-G5, the θ phase difference of the T2R relative phase of the antenna units a1-a16 can be obtained.

Similarly, the α phase difference and the β phase difference of the T2R relative phase of the antenna units a1-a16 can be obtained by the method of the present invention, respectively. For brevity, similar descriptions are not repeated in detail here.

By adding the α phase difference, the β phase difference, and the θ phase difference of the T2R relative phase of the antenna units a1-a16 together, the T2R relative phase of the antenna units a1-a16 in the same AM 300 can be obtained. After the T2R relative phase is calibrated by the method of the present invention, the mmWave AM using the AM 300 may have better reciprocity between TX and RX paths. In addition, it may also improve beamforming loss to have better beam correspondence between TX and the RX paths of the antenna units a1-a16 in the AM 300.

Figure 4:
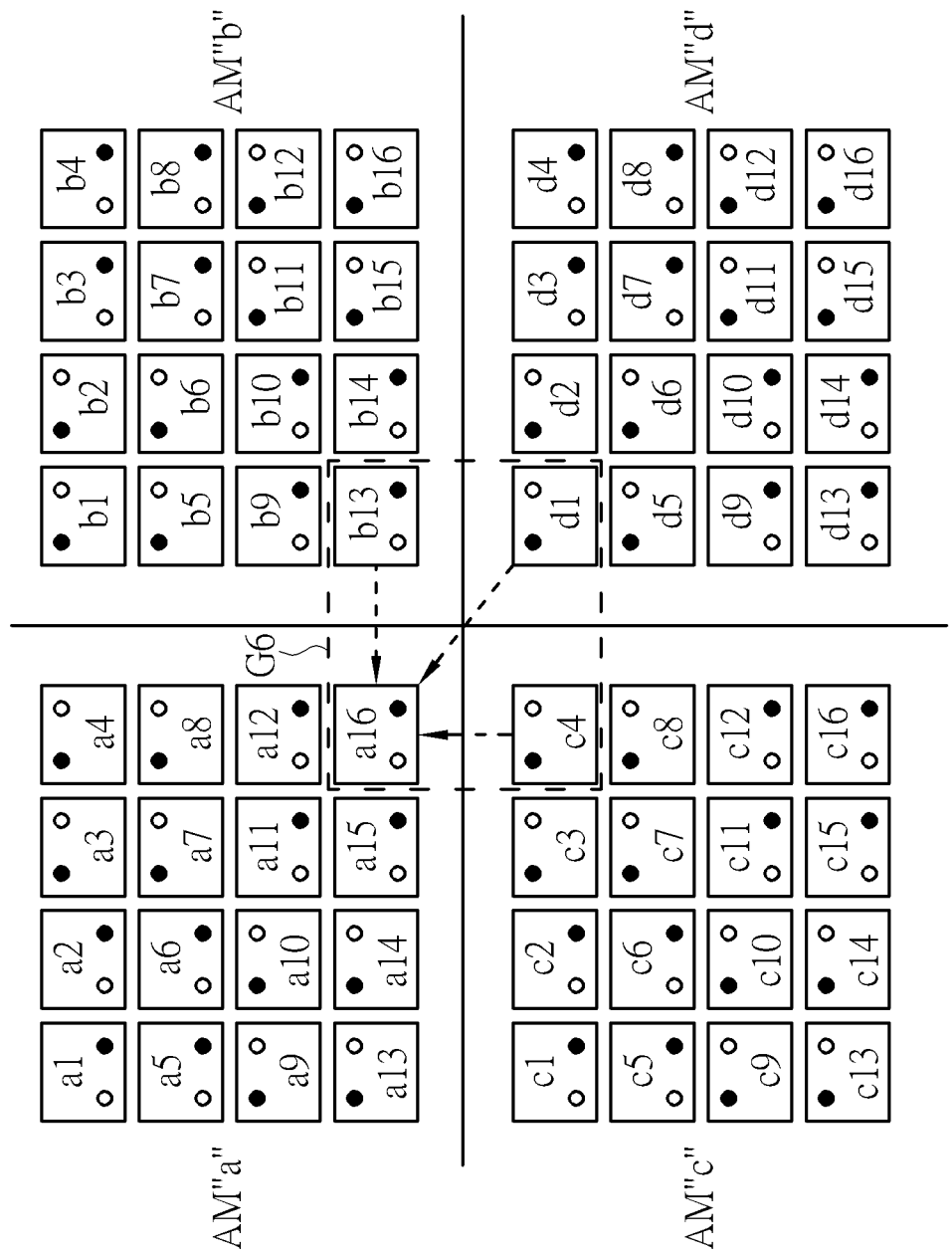
FIG. 4 is a diagram illustrating a larger antenna array calibration of a T2R relative phase of 64 antenna units according to an embodiment of the present invention.

FIG. 4 is a diagram illustrating a larger antenna array calibration of a T2R relative phase of 64 antenna units according to an embodiment of the present invention. As shown in FIG. 4, there are 4 AMs, including AM "a", AM "b", AM "c", and AM "d", wherein AM "a" includes 16 antenna units a1-a16, AM "b" includes 16 antenna units b1-b16, AM "c" includes 16 antenna units c1-c16, and AM "d" includes 16 antenna units d1-d16 (i.e. the 64 antenna units includes the antenna units a1-a16, b1-b16, c1-c16, and d1-d16). In addition, the intra-AM T2R relative phases of the antenna units a1-a16, b1-b16, c1-c16, and d1-d16 can be obtained by the above-mentioned embodiment shown in FIG. 3, respectively. For brevity, similar descriptions are not repeated in detail here. After obtaining the intra-AM T2R relative phases of the antenna units a1-a16, b1-b16, c1-c16, and d1-d16, respectively, the antenna units a16, b13, c4, d1 belong to different AMs are set in a same group G6, wherein the antenna unit a16 is set as the anchor of the group G6. It should be noted that, the selection of the antenna units b13, c4, and d1 and the anchor a16 in this embodiment is for illustrative purposes only, and is not meant to be a limitation of the present invention.

For AM "b", by referring the antenna unit b13 to the anchor a16, the θ phase difference of the T2R relative phase of the antenna units a16 and b13 can be obtained by adding a phase difference calculated by subtracting the initial phase of the LO signal path of the TX path (which is connected to the polarization H) of the antenna unit a16 from the initial phase of the LO signal path of the TX path (which is connected to the polarization H) of the antenna unit b13 to another phase difference calculated by subtracting the initial phase of the LO signal path of the RX path (which is connected to the polarization H) of the antenna unit a16 from the initial phase of the LO signal path of the RX path (which is connected to the polarization H) of the antenna unit b13. Similarly, the α phase difference and the β phase difference of the T2R relative phase of the antenna units a16 and b13 can be obtained by the method of the present invention, respectively. For brevity, similar descriptions are not repeated in detail here. By adding the α phase difference, the β phase difference, and the θ phase difference of the T2R relative phase of the antenna units a16 and b13 together, the T2R relative phase of the antenna units a16 and b13 can be obtained. Then, by adding the T2R relative phase of the antenna units b1-b16 obtained by the above-mentioned embodiment shown in FIG. 3 to the T2R relative phase of the antenna units a16 and b13, the T2R relative phase of the antenna units b1-b16 and a16 can be obtained.

For AM "c", by referring the antenna unit c4 to the anchor a16, the θ phase difference of the T2R relative phase of the antenna units a16 and c4 can be obtained by adding a phase difference calculated by subtracting the initial phase of the LO signal path of the TX path (which is connected to the polarization H) of the antenna unit a16 from the initial phase of the LO signal path of the TX path (which is connected to the polarization H) of the antenna unit c4 to another phase difference calculated by subtracting the initial phase of the LO signal path of the RX path (which is connected to the polarization H) of the antenna unit a16 from the initial phase of the LO signal path of the RX path (which is connected to the polarization H) of the antenna unit c4. Similarly, the α phase difference and the β phase difference of the T2R relative phase of the antenna units a16 and c4 can be obtained by the method of the present invention, respectively. For brevity, similar descriptions are not repeated in detail here. By adding the α phase difference, the β phase difference, and the θ phase difference of the T2R relative phase of the antenna units a16 and c4 together, the T2R relative phase of the antenna units a16 and c4 can be obtained. Then, by adding the T2R relative phase of the antenna units c1-c16 obtained by the above-mentioned embodiment shown in FIG. 3 to the T2R relative phase of the antenna units a16 and c4, the T2R relative phase of the antenna units b1-b16 and a16 can be obtained.

For AM "d", by referring the antenna unit d1 to the anchor a16, the θ phase difference of the T2R relative phase of the antenna units a16 and d1 can be obtained by adding a phase difference calculated by subtracting the initial phase of the LO signal path of the TX path (which is connected to the polarization H) of the antenna unit a16 from the initial phase of the LO signal path of the TX path (which is connected to the polarization H) of the antenna unit d1 to another phase difference calculated by subtracting the initial phase of the LO signal path of the RX path (which is connected to the polarization H) of the antenna unit a16 from the initial phase of the LO signal path of the RX path (which is connected to the polarization H) of the antenna unit d1. Similarly, the α phase difference and the β phase difference of the T2R relative phase of the antenna units a16 and d1 can be obtained by the method of the present invention, respectively. For brevity, similar descriptions are not repeated in detail here. By adding the α phase difference, the β phase difference, and the θ phase difference of the T2R relative phase of the antenna units a16 and d1 together, the T2R relative phase of the antenna units a16 and d1 can be obtained. Then, by adding the T2R relative phase of the antenna units d1-d16 obtained by the above-mentioned embodiment shown in FIG. 3 to the T2R relative phase of the antenna units a16 and d1, the T2R relative phase of the antenna units d1-d16 and a16 can be obtained.

Finally, according to the T2R relative phase of the antenna units a1-a16 obtained by the above-mentioned embodiment shown in FIG. 3, the T2R relative phase of the antenna units b1-b16 and a16, the T2R relative phase of the antenna units b1-b16 and a16, and the T2R relative phase of the antenna units d1-d16 and a16, the T2R relative phase of 64 antenna units in different AMs may be obtained. After the T2R relative phase is calibrated by the method of the present invention, the mmWave AM using multiple AMs may have better beam correspondence between TX and RX beams.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calibrating a transmitter-to-receiver (T2R) relative phase in millimeter wave (mmWave) beamforming system, comprising:
    transmitting a first calibrated signal to a second antenna of the mmWave beamforming system through a first antenna of the mmWave beamforming system according to a first transmitter (TX) input signal;
    receiving the first calibrated signal through the second antenna, and obtaining a first loopback receiver (RX) signal according to the first calibrated signal received by the second antenna;
    transmitting a second calibrated signal to the first antenna through the second antenna according to a second TX path input signal;
    receiving the second calibrated signal through the first antenna, and obtaining a second loopback RX signal according to the second calibrated signal received by the first antenna; and
    calibrating the T2R relative phase according to a phase difference between the first and second loopback RX signals.

2. The method of claim 1, wherein the first calibrated signal is transmitted by a first TX path, the second calibrated signal is transmitted by a second TX path, the second calibrated signal is received by a first RX path, the first calibrated signal is received by a second RX path; the first TX path, the first RX path, the first antenna, the second TX path, the second RX path, and the second antenna are all packaged in a same antenna module (AM).

3. The method of claim 2, wherein the T2R relative phase comprises a difference between a first phase difference and a second phase difference, the first phase difference is between a phase mismatch of a signal path of the first TX path and a phase mismatch of a signal path of the second TX path, and the second phase difference is between a phase mismatch of a signal path of the first RX path and a phase mismatch of a signal path of the second RX path.

4. The method of claim 2, wherein the T2R relative phase comprises a sum of a first phase difference and a second phase difference, the first phase difference is between a phase mismatch of a local oscillator (LO) signal path of the first TX path and a phase mismatch of an LO signal path of the second TX path, and the second phase difference is between a phase mismatch of an LO signal path of the first RX path and a phase mismatch of an LO signal path of the second RX path.

5. The method of claim 2, wherein the T2R relative phase comprises a sum of a first phase difference and a second phase difference, the first phase difference is between an initial phase of an LO signal path of the first TX path and an initial phase of an LO signal path of the second TX path, and the second phase difference is between an initial phase of an LO signal path of the first RX path and an initial phase of an LO signal path of the second RX path.

6. The method of claim 1, wherein the first calibrated signal is transmitted by a first TX path, the second calibrated signal is transmitted by a second TX path, the second calibrated signal is received by a first RX path, the first calibrated signal is received by a second RX path; the first TX path, the first RX path, and the first antenna are packaged in a first antenna module (AM); and the second TX path, the second RX path, and the second antenna are packaged in a second AM.

7. The method of claim 6, wherein the T2R relative phase comprises a difference between a first phase difference and a second phase difference, the first phase difference is between a phase mismatch of a signal path of the first TX path and a phase mismatch of a signal path of the second TX path, and the second phase difference is between a phase mismatch of a signal path of the first RX path and a phase mismatch of a signal path of the second RX path.

8. The method of claim 6, wherein the T2R relative phase comprises a sum of a first phase difference and a second phase difference, the first phase difference is between a phase mismatch of a local oscillator (LO) signal path of the first TX path and a phase mismatch of an LO signal path of the second TX path, and the second phase difference is between a phase mismatch of an LO signal path of the first RX path and a phase mismatch of an LO signal path of the second RX path.

9. The method of claim 6, wherein the T2R relative phase comprises a sum of a first phase difference and a second phase difference, the first phase difference is between an initial phase of an LO signal path of the first TX path and an initial phase of an LO signal path of the second TX path, and the second phase difference is between an initial phase of an LO signal path of the first RX path and an initial phase of an LO signal path of the second RX path.

10. A millimeter wave (mmWave) antenna module (AM), comprising:
    a first mmWave transceiver path, comprising:
        a first antenna;
        a first transmitter (TX) path, arranged to transmit a first calibrated signal to a second antenna through the first antenna according to a first TX input signal; and
        a first receiver (RX) path, arranged to receive a second calibrated signal through the first antenna, and obtain a second loopback RX signal according to the second calibrated signal received by the first antenna;
    a second mmWave transceiver path, comprising:
        the second antenna;
        a second TX path, arranged to transmit the second calibrated signal to the first antenna through the second antenna according to a second TX input signal; and
        a second RX path, arranged to receive the first calibrated signal through the second antenna, and obtain a first loopback RX signal according to the first calibrated signal received by the second antenna; and a calibration engine, arranged to utilize the first and second RX loopback signals to calibrate a transmitter-to-receiver (T2R) relative phase.

11. The mmWave AM of claim 10, wherein the first TX path, the first RX path, the first antenna, the second TX path, the second RX path, and the second antenna are all packaged in a same AM.

12. The mmWave AM of claim 11, wherein the T2R relative phase comprises a difference between a first phase difference and a second phase difference, the first phase difference is between a phase mismatch of a signal path of the first TX path and a phase mismatch of a signal path of the second TX path, and the second phase difference is between a phase mismatch of a signal path of the first RX path and a phase mismatch of a signal path of the second RX path.

13. The mmWave AM of claim 11, wherein the T2R relative phase comprises a sum of a first phase difference and a second phase difference, the first phase difference is between a phase mismatch of a local oscillator (LO) signal path of the first TX path and a phase mismatch of an LO signal path of the second TX path, and the second phase difference is between a phase mismatch of an LO signal path of the first RX path and a phase mismatch of an LO signal path of the second RX path.

14. The mmWave AM of claim 11, wherein the T2R relative phase comprises a sum of a first phase difference and a second phase difference, the first phase difference is between an initial phase of an LO signal path of the first TX path and an initial phase of an LO signal path of the second TX path, and the second phase difference is between an initial phase of an LO signal path of the first RX path and an initial phase of an LO signal path of the second RX path.

15. The mmWave AM of claim 10, wherein the first TX path, the first RX path, and the first antenna are packaged in a first AM; and the second TX path, the second RX path, and the second antenna are packaged in a second AM.

16. The mmWave AM of claim 15, wherein the T2R relative phase comprises a difference between a first phase difference and a second phase difference, the first phase difference is between a phase mismatch of a signal path of the first TX path and a phase mismatch of a signal path of the second TX path, and the second phase difference is between a phase mismatch of a signal path of the first RX path and a phase mismatch of a signal path of the second RX path.

17. The mmWave AM of claim 15, wherein the T2R relative phase comprises a sum of a first phase difference and a second phase difference, the first phase difference is between a phase mismatch of a local oscillator (LO) signal path of the first TX path and a phase mismatch of an LO signal path of the second TX path, and the second phase difference is between a phase mismatch of an LO signal path of the first RX path and a phase mismatch of an LO signal path of the second RX path.

18. The mmWave AM of claim 15, wherein the T2R relative phase comprises a sum of a first phase difference and a second phase difference, the first phase difference is between an initial phase of an LO signal path of the first TX path and an initial phase of an LO signal path of the second TX path, and the second phase difference is between an initial phase of an LO signal path of the first RX path and an initial phase of an LO signal path of the second RX path.

* * * * *